United States Patent [19]

Satoh

[11] Patent Number: 5,696,640
[45] Date of Patent: Dec. 9, 1997

[54] DISK DRIVE USING VIRTUAL HANDS FOR CONTINUOUS ACCESS AND EXECUTION

[75] Inventor: Masafumi Satoh, Kawasaki, Japan

[73] Assignee: Fujitsu Ltd., Kawasaki, Japan

[21] Appl. No.: 57,312

[22] Filed: May 4, 1993

[30] Foreign Application Priority Data

May 6, 1992 [JP] Japan ................................. 4-113734

[51] Int. Cl.$^6$ ................................................. G11B 15/12
[52] U.S. Cl. ........................... 360/61; 360/48; 360/55; 386/70; 386/125; 369/32
[58] Field of Search ........................ 360/61, 48, 51, 360/60, 77.04, 78.04, 50, 69, 22; 364/400; 370/58.2; 371/10.1; 395/425, 400; 369/32; 386/40, 45, 69, 70

[56] References Cited

U.S. PATENT DOCUMENTS

| | | | |
|---|---|---|---|
| 4,112,258 | 9/1978 | Alles | 370/58.2 |
| 4,500,965 | 2/1985 | Gray | 364/400 |
| 4,858,034 | 8/1989 | Hassel et al. | 360/51 |
| 4,862,295 | 8/1989 | Tanaka et al. | 360/48 |
| 5,018,095 | 5/1991 | Nissimov | 395/425 |
| 5,077,736 | 12/1991 | Dunphy, Jr. et al. | 371/10.1 |
| 5,208,711 | 5/1993 | Khamura et al. | 360/60 X |
| 5,247,638 | 9/1993 | O'Brien et al. | 395/425 |
| 5,270,885 | 12/1993 | Satoh et al. | 360/77.04 |

*Primary Examiner*—Aristotelis M. Psitos
*Assistant Examiner*—Patrick Wamsley
*Attorney, Agent, or Firm*—Greer, Burns & Crain, Ltd.

[57] ABSTRACT

A disk drive such as a magnetic disk drive includes a command-receiving mechanism for receiving a command from a host device, by which access operations for consecutive sectors are requested, a access-designating mechanism for designating continuous-access operations in the form of jump-access operations with respect to the sectors of at least one disk medium, when the command is sent from the command-receiving mechanism and a continuous-access executing mechanism for executing the continuous-access operations at every other sector, e.g., each odd sector or each even sector, by utilizing the same head.

Preferably, the access-designating mechanism includes a circuit for conversion of the width of data, in which a process for conversion is executed, between the width of the data that are handled in the command-receiving mechanism and the width of the data that are handled in the continuous-access executing mechanism so that the continuous-access operations at every other sector location can be realized.

12 Claims, 15 Drawing Sheets

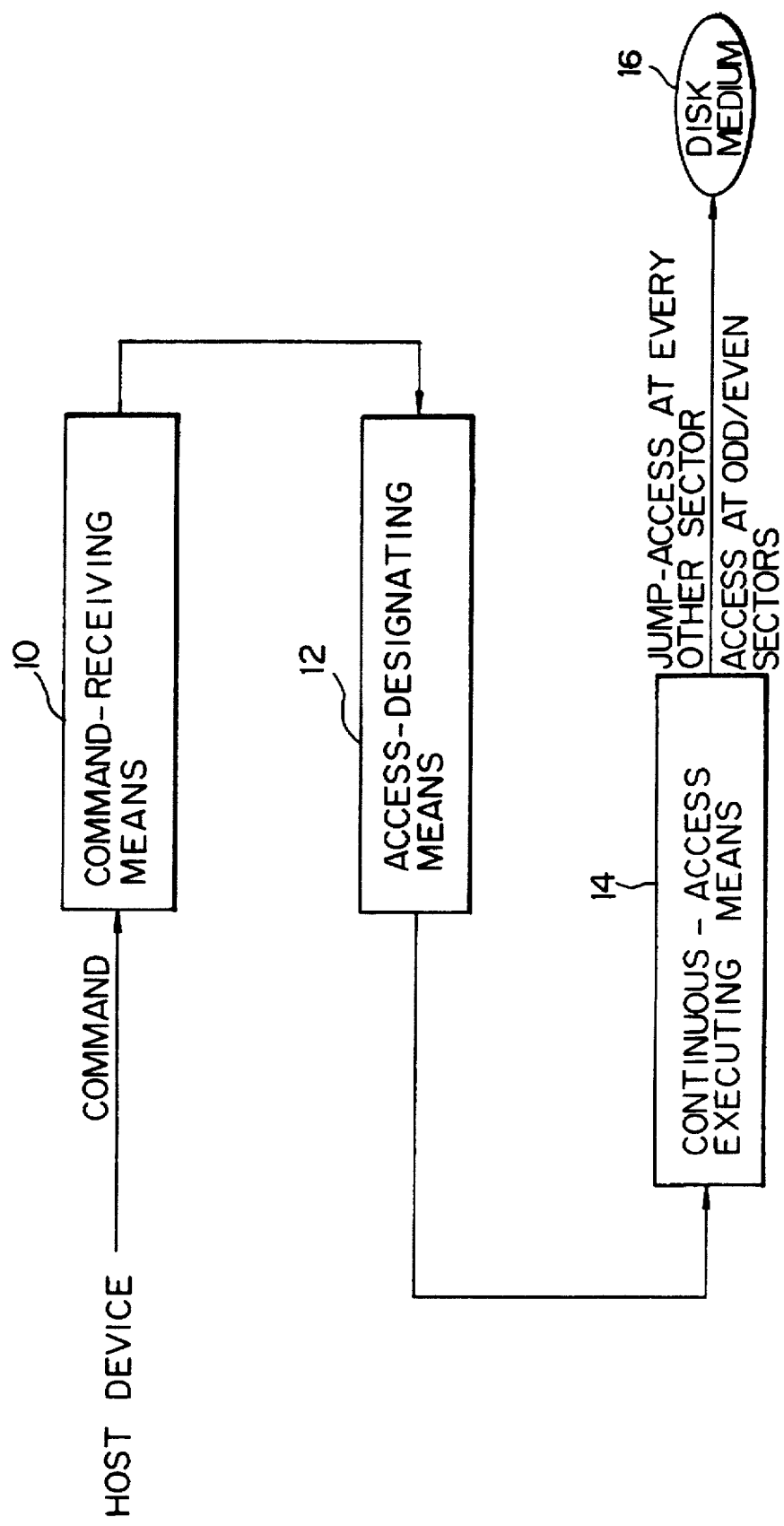

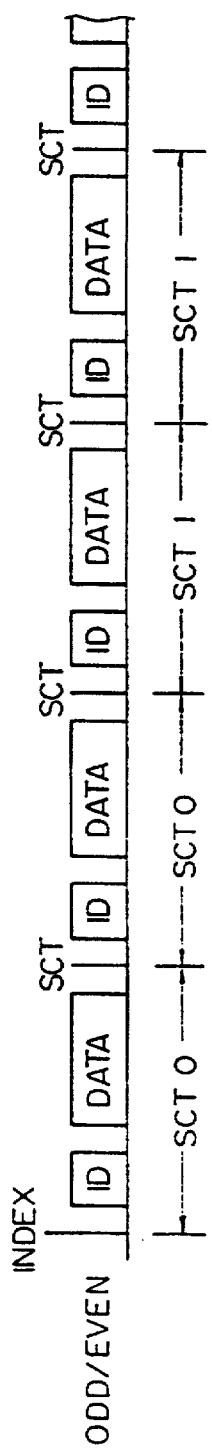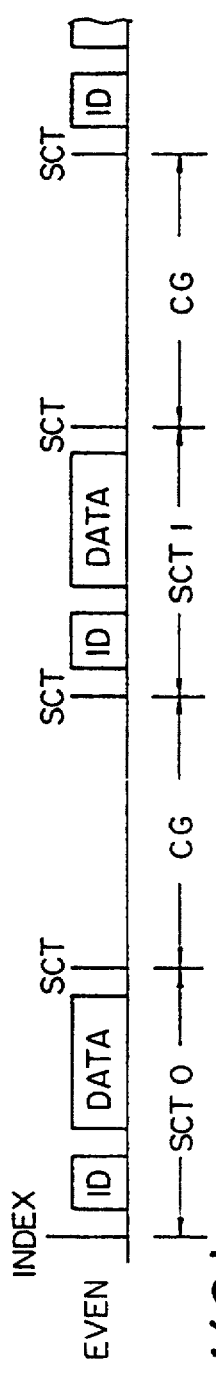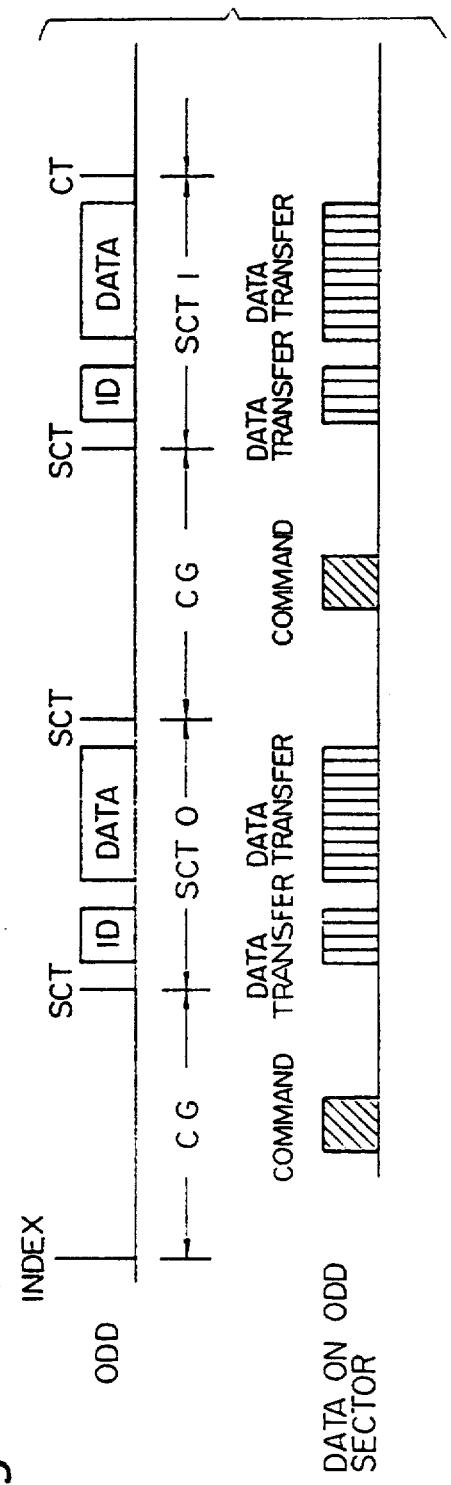

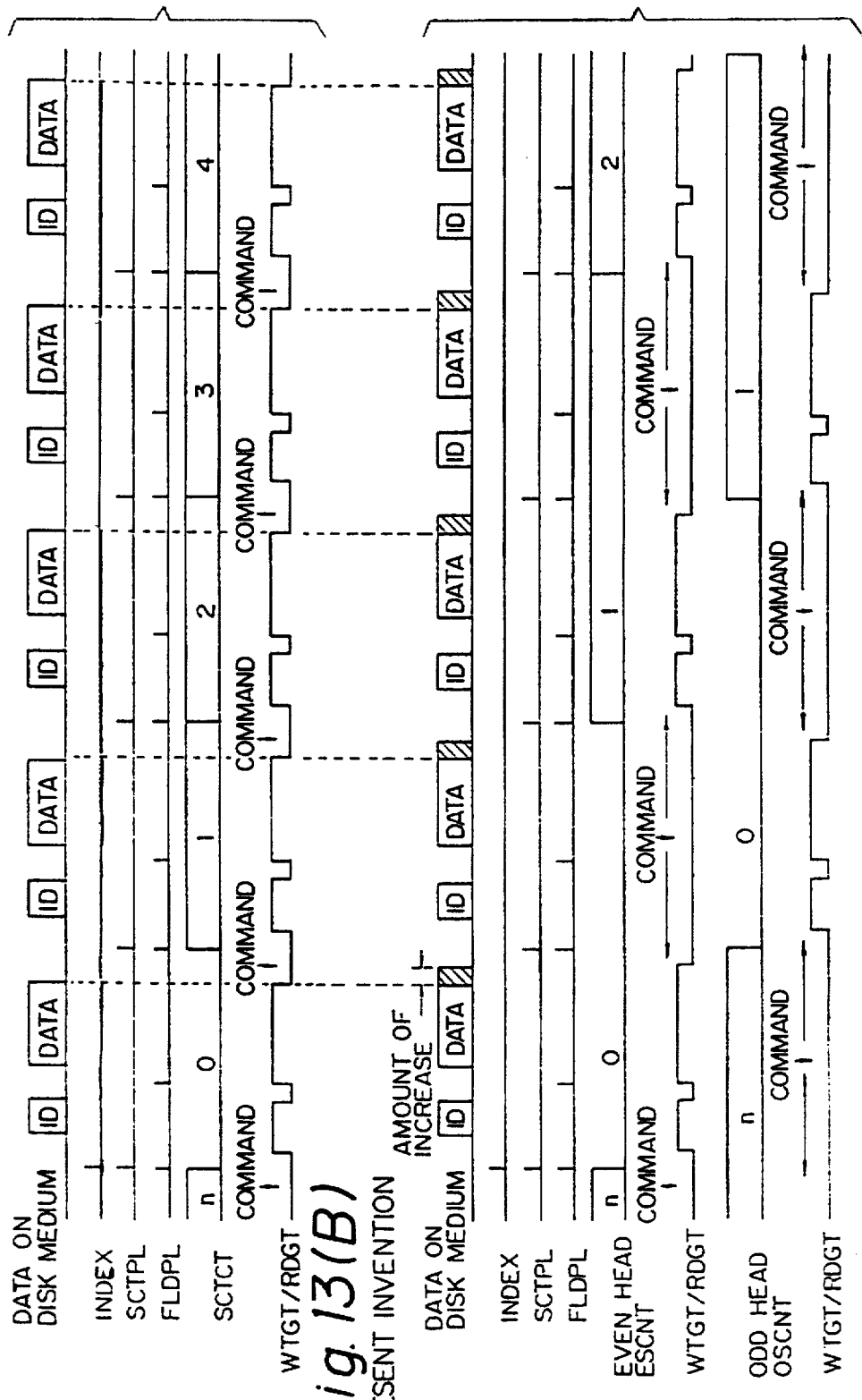

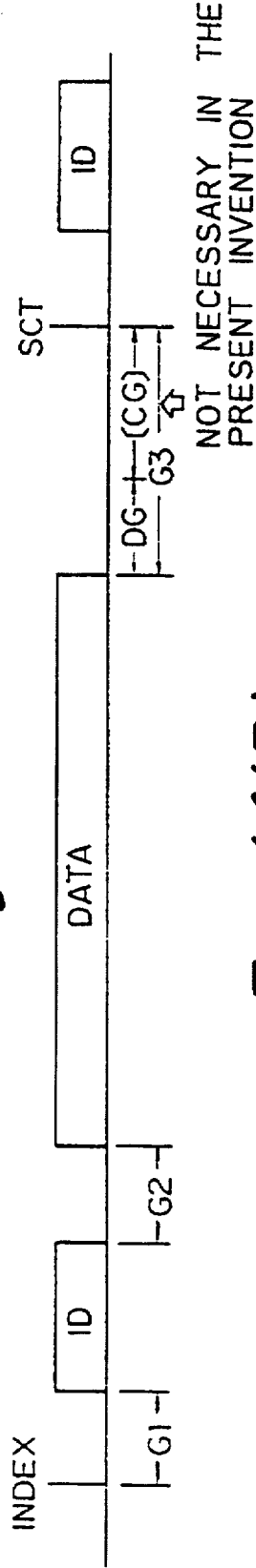
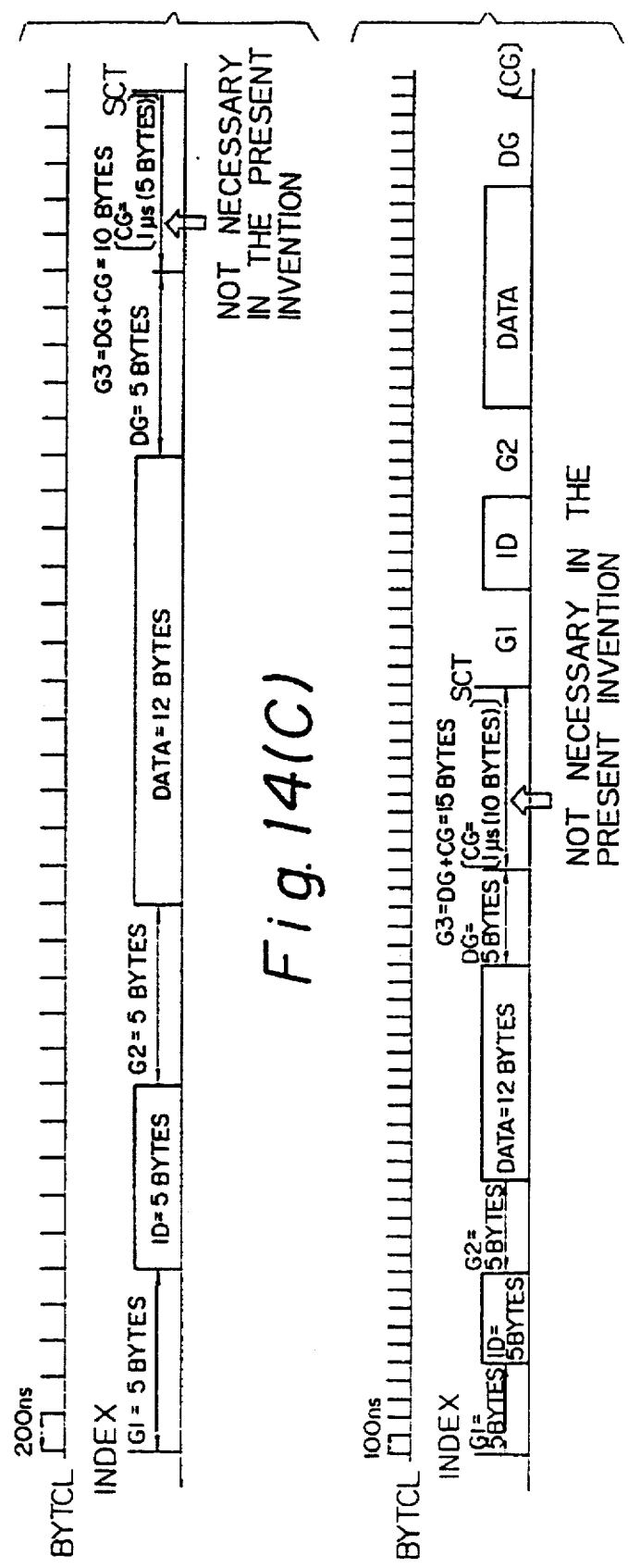
Fig. 14(A)
Fig. 14(B)
Fig. 14(C)

DISK DRIVE USING VIRTUAL HANDS FOR CONTINUOUS ACCESS AND EXECUTION

BACKGROUND OF THE INVENTION

1. Field of the Invention

The present invention relates to a disk drive, e.g., a magnetic disk drive, which allows continuous-access operations on a plurality of sectors of at least one recording medium, e.g., at least one magnetic disk, to be performed.

More specifically, the present invention relates to a disk drive, which improves the capacity of the magnetic disk, etc., where data are written on the respective sectors in a predetermined format, to be utilized effectively, so that a large amount of data can be transferred at high speed.

2. Description of the Related Art

There is recently a tendency to demand, in a computer system, the transfer of a large amount of data at high speed, and therefore, an auxiliary storage device, such as a magnetic disk drive, a magneto-optical disk drive, or an optical disk drive, is also required to transfer a large amount of data at high speed to exchange data with a host device, e.g., a host computer.

To meet this requirement, an attempt has been made to shorten the waiting time(latency time) for data transfer to and from a magnetic disk drive, etc., and to remarkably improve the access time of a magnetic disk drive, etc., by adopting the specific interface, such as SCSI(Small Computer Systems Interface) or IPI(Intelligent Peripheral Interface)-2, in which a cache buffer memory operating at high speed is utilized. Further, the whole storage capacity of the magnetic disk, etc., on which data are written by the given format in accordance with the above-mentioned specific interface is likely to be remarkably increased, as the amount of programs of a computer system and the amount of data become larger.

When the waiting time for data transfer for the disk drive is relatively reduced as described above, and the performance of the disk drive regarding the data transfer speed and the data storage capacity of the disk medium is remarkably improved, the amount of data, which a host controller arranged between the disk drive and the host computer has to process in read/write operations in the given time, is necessarily increased. Accordingly, the time required for completing data processing in the host controller is likely to be increased.

Therefore, the whole capacity of the magnetic disk cannot be effectively used for data storage, and the efficiency of utilization for the magnetic disk is lowered, with an increase of the amount of transferred data.

Here, to clearly describe a problem regarding a conventional disk drive, a disk medium in the disk drive according to the prior art will be described with reference to the related drawings of FIGS. 1 and 2. In this case, the configuration of a magnetic disk of a magnetic disk drive will be illustrated representatively.

FIG. 1 is a schematic diagram showing data configuration of each physical sector constituting a magnetic disk in a magnetic disk drive according to the prior art, and FIG. 2 is a format diagram showing in detail a format configuration of each physical sector of a magnetic disk in a magnetic disk drive according to the prior art.

In general, a magnetic disk is constituted by a plurality of tracks each arranged in a concentric form. Further, each track is divided into a number of sectors, e.g., 64 sectors such as SCT0, SCT1, SCT2, SCT3, . . . , SCT63, each having an identification field ID for storing the information regarding the position thereof, i.e., a specific sector address on the track, and each having a data field DATA for storing data, as shown in FIG. 1.

To be more specific, the region of SCT0 is defined by an index signal INDEX indicating the reference for performing read/write operations on each track and by one sector signal SCT indicating a boundary between SCT0 and SCT1. Further, the region of SCT1 is defined by two sector signals SCT each indicating a boundary between adjoining sectors. Also, the respective regions of the other sectors, e.g., SCT2 and SCT3, are defined in similar manners.

When write commands for write operations are issued from the host computer via the host controller, the given data are transferred to the magnetic disk, so that continuous-access operations can be executed for a plurality of sectors SCT0, SCT1, SCT2, SCT3, etc., of the magnetic disk, and the data are sequentially written in the respective data fields DATA of these sectors. On the other hand, when read commands for read operations are issued from the host computer via the host controller, the continuous-access operations are executed for a plurality of sectors SCT0, SCT1, SCT2, SCT3, etc., where the desired data are stored in advance, and the data are sequentially read out of the respective data fields DATA thereof.

In FIG. 2, the format of one of the sectors(SCT0, SCT1, SCT2, SCT3, etc.) is indicated in an enlarged form. Further, as shown in the timing chart of read/write operations in FIG. 2, G1 and G2 denotes gaps which are necessary for an access control for read/write operations within a magnetic disk drive. The gaps G1 and G2 are provided before and after each identification field ID, respectively. Also, DG denotes a data gap which is necessary for the access control for read/write operations within the magnetic disk drive, similar to gaps G1 and G2. The gap G2 described before is provided between each identification field ID and each data field DATA and the gap DG is provided after the data field DATA. These gaps G1, G2 and DG are designed to have gap lengths such that the access control for the magnetic disk drive can be assuredly performed.

Further, a controller gap CG is provided in the last portion of each sector and before a gap G1 of the next sector, so that access operations can be consecutively performed for the next sector without the waiting time including the time required for seek operations of magnetic heads. Namely, the host controller is adapted to consecutively transmit each of access commands such as write commands or read commands to the magnetic disk drive, within the gap length of the controller gap CG. Gap G3 is obtained by adding together the gaps DG and CG, and is arranged between the end of the field DATA and the beginning of the next sector. The broken lines, shown in the left portions in the timing chart of read/write operations, indicate that the read operations and the write operations are not executed in the same timing.

Further, as shown in the lowest portion of FIG. 2, interface signals(I/F signals), e.g., command signals for transmitting the access commands and data signals for executing data transfer and read/write operations on the ID and DATA fields are sequentially transmitted. Further, the data signals for executing the data transfer are modulated with an adequate modulation method and recorded as the data on the sectors of the magnetic disk in write operations. On the other hand, the recorded data are reproduced from the sectors of the magnetic disk and demodulated with an adequate demodulation method into the original data signals in read operations.

At this time, in order to execute such modulation and demodulation for the data in the correct timing, it is necessary for the host controller to be operated in synchronism with the index signal INDEX and each sector signal SCT, based on the format of each sector of the magnetic disk. Further, in such a synchronous operation of the host controller, it is also necessary to discriminate a certain signal from other signals and various noises and to confirm whether or not all the signals including command signals and data signals are transferred correctly. Therefore, the gaps G1 and G2 have to be provided before and after the fields ID, and the gaps G2 and G3 have to be provided before and after the fields DATA. Furthermore, adequate gaps within the controller gap CG have to be provided before and after each command signal.

In other words, the gaps G1, G2 and G3, and the identification field ID are required for establishing the format configuration of data on the sectors of the magnetic disk, in addition to the data field DATA. Therefore, the whole capacity of the magnetic disk cannot be utilized for storing data.

Consequently, a problem occurs that the ratio of the practical format capacity of the magnetic disk with respect to the whole capacity thereof is only sixty to seventy-five percent(60 to 75%) and an efficiency of utilization(also referred to as a format efficiency) is relatively low. Further, the degree of deterioration of a format efficiency becomes remarkable as data transfer speed in the magnetic disk drive is increased.

For example, it is assumed that a magnetic disk drive includes a plurality of magnetic disks and has the whole capacity of 2,648,136,240 Bytes(the capacity of every track is 66,096 Bytes/Track, the number of magnetic heads is 15 Heads, and the number of tracks at every recording/reproducing surface is 2,671 Tracks; namely, 66,096×15×2, 671=2,648,136,240). Further, it is assumed that the gap length of the gap G1 is 22 Bytes; the gap length of the gap G2 is 26 Bytes; the gap length of the gap DG is 26 Bytes; the gap length of the gap CG is 84 Bytes; the length of the identification field ID is 12 Bytes; and the length of the data field DATA is 514 Bytes. In this case, the capacity of every sector becomes 684 Bytes/Sectors {the total gap length is 158(=22+26+26+84), and the length of fields is 526 (=12+514)}, and the number of sectors at every track becomes 96 Sectors/Track(≈66,096÷684). Consequently, a value of the format efficiency in the magnetic disk drive of the prior art is reduced to 74.655%(514 Bytes×96 Sectors/Track×15 Heads×2,671 Tracks÷2,648,136,240 Bytes).

Furthermore, in the conventional magnetic disk drive utilizing a two-head-parallel system, in which data are written simultaneously on both surfaces of each magnetic disk with two heads, and in which data transfer speed at the side of host controller can be increased twice, the number of sectors at every track is also increased twice equivalently. Namely, the above-mentioned number 96 Sectors/Track becomes 192 Sectors/Track. Therefore, in the case where such a two-head-parallel system is adopted to the magnetic disk drive, it has a disadvantage that the format efficiency is further deteriorated.

SUMMARY OF THE INVENTION

In view of the above-mentioned problem, the main object of the present invention is to provide a disk drive which enables the capacity of the disk medium to be utilized more effectively and which enables an efficiency of utilization, i.e., a format efficiency, to be increased.

A further object of the present invention is to provide a disk drive, in which the format efficiency is not deteriorated, even though data transfer speed within the disk drive is increased.

A still further object of the present invention is to provide a disk drive in which the format efficiency is not deteriorated, even though data transfer speed at the side of host controller is increased.

A still further object of the present invention is to provide a disk drive, which can be applied to a magnetic disk drive including at least one magnetic disk as the disk medium.

To attain the above objects, the disk drive according to the present invention includes command-receiving means for receiving a command from a host device, by which access operations for consecutive sectors are requested; access-designating means for designating continuous-access operations in the form of jump-access operations with respect to the sectors, when the command is sent from the command-receiving means; and continuous-access executing means for executing the continuous-access operations for the sectors at every other sector location.

Preferably, the disk drive according to the present invention includes command-receiving means for receiving a command which includes a request for access operations for consecutive sectors having odd sectors and even sectors of at least one disk medium, and which includes the content such that either one of two virtual heads defined with respect to the same head(physical head) is selected, from a host device; access-designating means for designating continuous-access operations to either odd sectors or even sectors in accordance with the virtual head selected by the command, when the command is sent from the command-receiving means; and continuous-access executing means for executing the continuous-access operations for odd sectors only, or for even sectors only, by utilizing the same head.

In a preferred embodiment, the command-receiving means includes at least one driver/receiver which receives the command from the host device; and a transfer buffer circuit which receives data including the command from the driver/receiver.

Further, in a preferred embodiment, the access-designating means includes a circuit for conversion of the width of data, in which a process for the conversion is executed, between the width of the data that are handled in the command-receiving means and the width of the data that are handled in the continuous-access executing means, so that the continuous-access operations at every other sector location can be realized.

Further, in a preferred embodiment, the continuous-access executing means includes a read/write control circuit which controls the continuous-access operations in accordance with the data sent from the circuit for conversion of the width of data.

Further, in the access-designating means, the circuit for conversion of the width of data has a first-in first-out buffer; a data transmission/reception control unit in which the data transferred from the transfer buffer circuit are converted to the data adequate for the continuous-access operations; and a read/write control processing unit which sends signals for selecting either the even sectors or the odd sectors, in accordance with the command from the host device, to the data transmission/reception control unit.

Preferably, the disk drive according to the present invention is realized by a magnetic disk drive including at least one magnetic disk as the disk medium and at least one magnetic head provided on the magnetic disk.

In such a construction as represented by the magnetic disk drive according to the present invention, continuous-access operations are performed in the form of jump-operations at every other sector, such as each odd sector or each even sector, in accordance with the virtual head selected by the command.

Accordingly, the command can be transferred in the duration in which the access operations are not performed in the adjoining sector. Therefore, the region of each adjoining sector where the access operations are skipped can be utilized as the controller gap CG. Namely, the capacity of the disk can be utilized more effectively, and a format efficiency of the disk drive can be increased.

BRIEF DESCRIPTION OF THE DRAWINGS

The above object and features of the present invention will be more apparent from the following description of the preferred embodiments with reference to the accompanying drawings, wherein:

FIG. 3 is a block diagram showing an essential embodiment of a disk drive based on the principle of the present invention;

FIGS. 11(A) to 11(C) are format diagrams for explaining continuous-access operations of odd and even sectors in a magnetic disk drive of a concrete embodiment according to the present invention;

FIGS. 13(A) and 13(B) are conceptual diagrams for explaining a feature of a magnetic disk drive of a concrete embodiment according to the present invention, in comparison with the prior art; and FIGS. 14(A) to 14(C) are conceptual diagrams for explaining another feature of a magnetic disk drive of a concrete embodiment according to the present invention.

DESCRIPTION OF THE PREFERRED EMBODIMENTS

Figure 1:
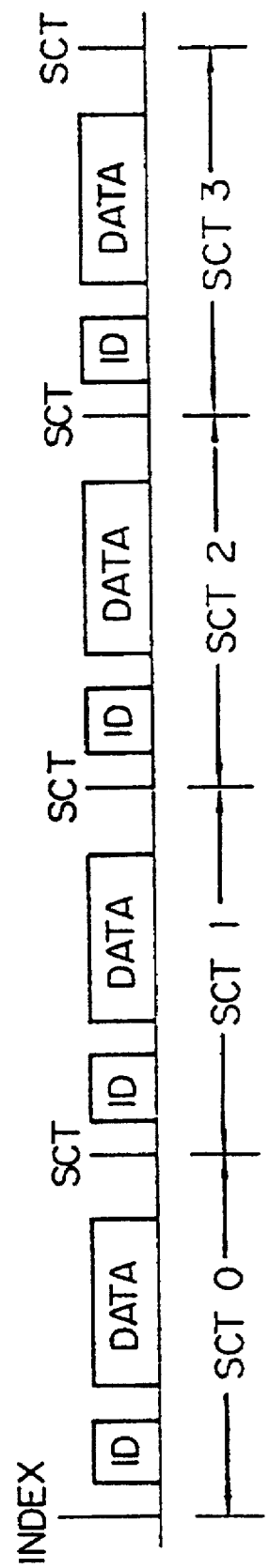
FIG. 1 is a schematic diagram showing a data configuration of each physical sector constituting a magnetic disk in a magnetic disk drive according to the prior art.

FIG. 3 is a block diagram showing an essential embodiment of a disk drive based on the principle of the present invention. Here, a disk drive according to the present invention, including one disk medium 16 and one physical head(not shown) provided corresponding to the disk medium 16, is representatively illustrated.

In the disk drive of FIG. 3, the reference numeral 10 denotes command-receiving means for receiving a command from a host device. In this case, the command includes a requirement for access operations for consecutive sectors (SCT0→SCT1→SCT2 . . . ) having odd sectors and even sectors of the disk medium 16, and includes the content (signal) such that either one of two virtual heads(logical heads) is selected. Further, the reference numeral 12 denotes access-designating means for designating continuous-access operations of either odd sectors or even sectors in accordance with the virtual head selected by the command, when the command is sent from the command-receiving means 10. Further, the reference numeral 14 denotes continuous-access executing means for executing the continuous-access operations for odd sectors only(SCT1→SCT3→SCT5 . . . ), or for even sectors only(SCT0→SCT2→SCT4 . . . ), by utilizing the same physical head.

In such a construction, continuous-access operations are performed in the form of jump-operations at every other sector, such as each odd sector or each even sector, in accordance with the virtual head selected by the command.

Figure 2:
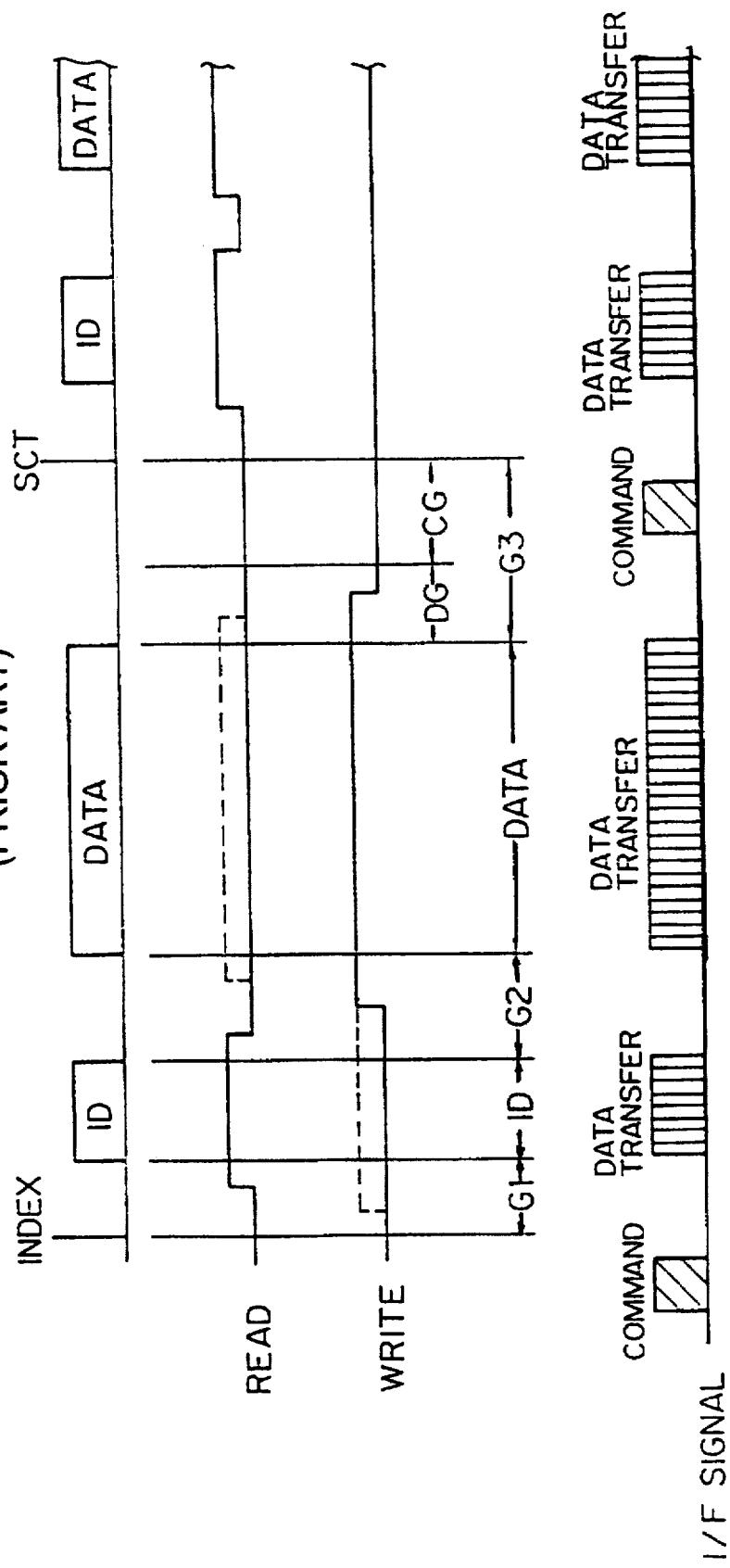
FIG. 2 is a format diagram showing in detail a format configuration of each physical sector of a magnetic disk in a magnetic disk drive according to the prior art.

Accordingly, the command can be delivered to the continuous-access executing means 14, in the duration in which the access operations to the adjoining sector are not performed. Therefore, the region of each adjoining sector where the access operations are skipped can be utilized as the controller gap CG(see FIG. 2). Namely, the capacity of the disk medium 16 can be utilized more effectively, and a format efficiency of the disk drive can be increased.

To be more specific, when the access operations are performed continuously for the odd sectors, the regions of even sectors can be substantially utilized as the controller gap CG, and vice versa. Furthermore, the single physical head can be utilized as two virtual heads for odd sectors and even sectors, respectively, in a manner such that two physical heads are simulated. Therefore, it is not necessary for the number of the physical heads to be increased in the present invention.

Hereinafter, a preferred and concrete embodiment of a disk drive according to the present invention will be described with reference to the accompanying drawings of FIGS. 4(A) to 14(C).

Figure 4A:
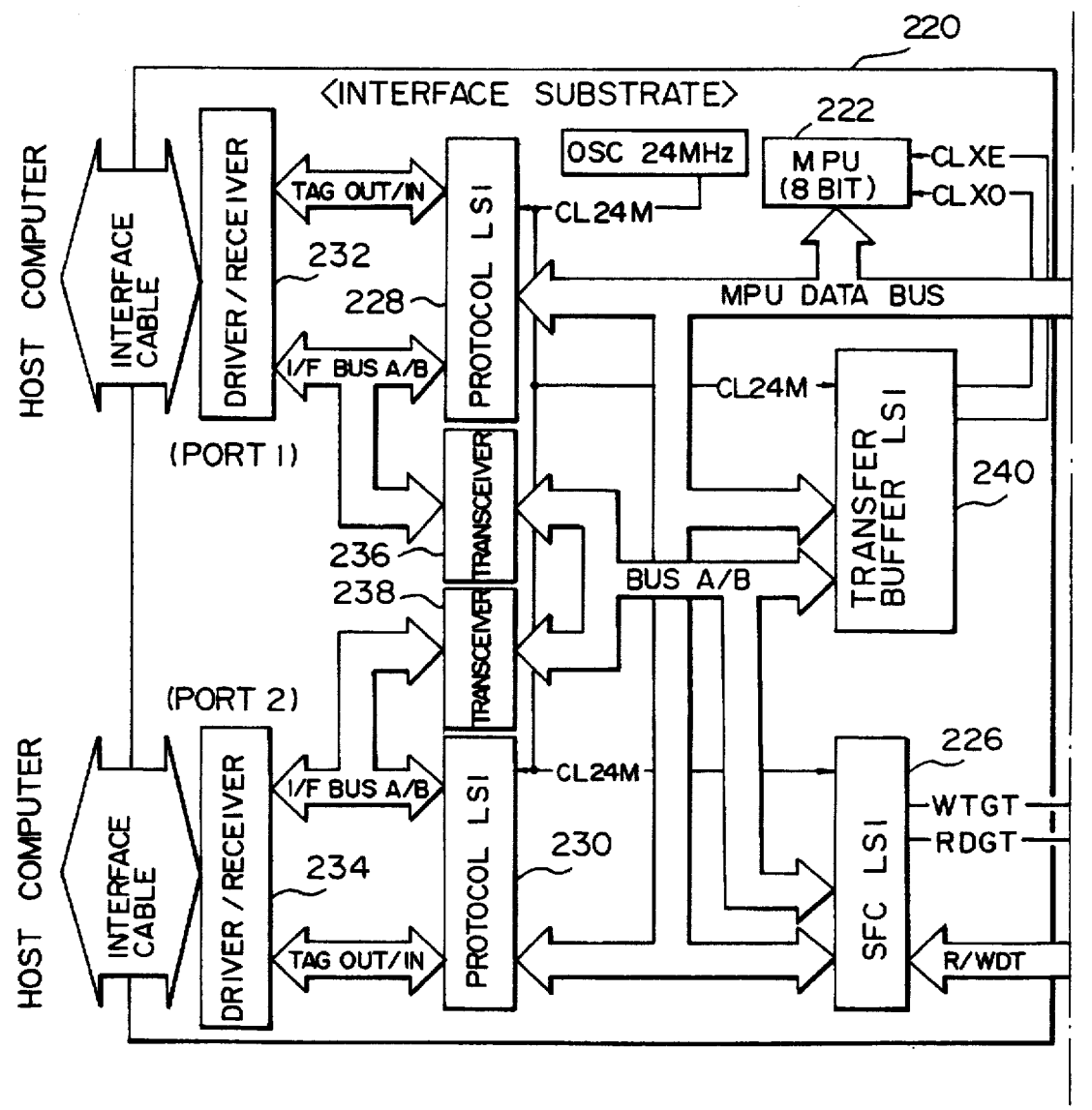
FIGS. 4(A) and 4(B) are block diagrams showing the whole construction of a concrete embodiment of a disk drive according to the present invention.
Figure 4B:
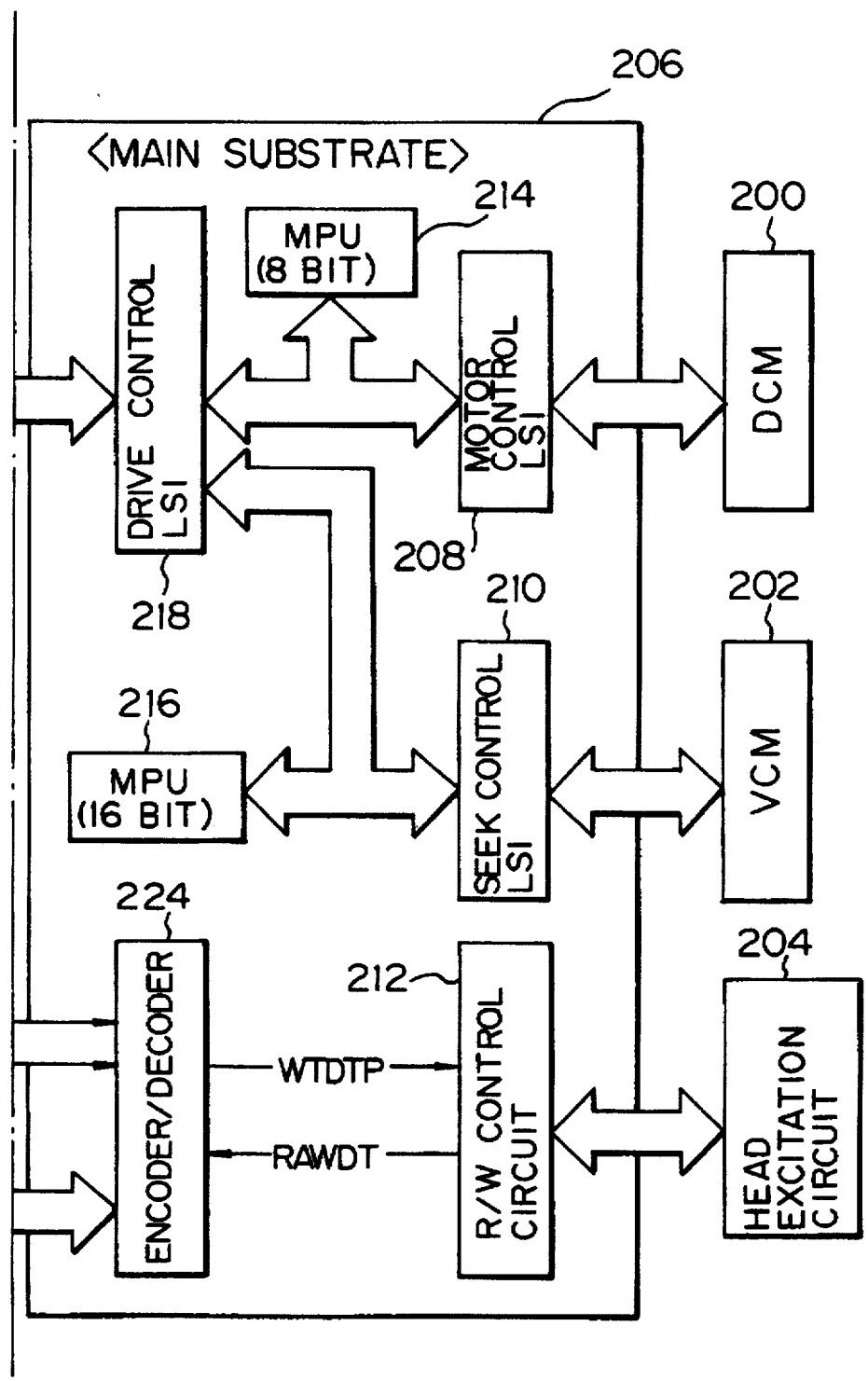

FIGS. 4(A) and 4(B) are block diagrams showing the whole construction of a disk drive of a concrete embodiment according to the present invention. In this case, as a typical example of the disk drive according to the present invention, an explanation regarding a magnetic disk drive including a plurality of magnetic disks will be made representatively. Further, any component that is the same as that mentioned before will be referred to using the same reference number.

Further, the whole construction of the magnetic disk drive should be illustrated in one drawing of FIG. 4. However, in this case, since it is difficult for FIG. 4 to be contained in one sheet, FIG. 4 is divided into two drawings of FIGS. 4(A) and 4(B). FIG. 4(A) includes the circuit construction of an interface circuit substrate 220, while FIG. 4(B) includes the circuit construction of a main circuit substrate 206 and some mechanical components.

In FIGS. 4(A) and 4(B), the mechanical components include a DC motor {(Direct Current Motor; abbreviated to "DCM" in FIG. 4(B)} 200 which forces a plurality of magnetic disks to rotate simultaneously around a disk spindle; and a voice coil motor(abbreviated to "VCM" in FIG. 4(B)) 202 which enables a plurality of magnetic heads to be positioned on the designated sectors of the magnetic disks for seek operations. Further, a head excitation circuit 204, which constitutes a part of the continuous-access executing means 14 shown in FIG. 3, is provided for forcing the magnetic heads to execute access operations for read/write operations on the designated sectors.

The above-mentioned DC motor 200, voice coil motor 202 and head excitation circuit 204 are controlled by a motor control LSI(Large Scale Integrated Circuit) 208, a seek control LSI 210 and a read/write(R/W) control LSI 212, which are all mounted on the main circuit substrate 206 and constitute other parts of the continuous-access executing means 14, respectively.

Further, an instruction for controlling the motor is given to the motor control LSI 208 by an MPU(Micro Processor Unit) 214 of 8 bit-type and is given to the seek control LSI 210 by an MPU 216 of 16 bit-type. These instructions for controlling the motors have been sent in advance from an MPU 222 of 8 bit-type on the interface circuit substrate 220 in FIG. 4(A) to the MPUs 214, 216, via an MPU data bus and a drive control LSI 218.

Further, an instruction for executing access operations for the disks is given to the read/write control LSI 212 by an LSI 226 for Serial/Parallel Formatter Control (abbreviated to "SFC LSI" in FIG. 4(A)) mounted on the interface circuit 220, via a read/write data bus(R/W DT) and an encoder/decoder 224. The lSI 226 constitutes the main part of the access-designating means 12 shown in FIG. 3, and will be described in detail in FIGS. 6 and 7. In this case, transmission and reception of data for write access or read access are performed between the read/write control LSI 212 and the LSI 226, by utilizing various signals based on the specification of IPI-2, e.g., write gate signal WTGT, data pulse signal WTDTP for write access, read gate signal RDGT and data pulse signal RAWDT for read access.

Further, commands transmitted from a host computer through two different interface cables for a port 1 and a port 2, which include the content of instruction for controlling the DC motor 200, voice coil motor 202 and head excitation circuit 204, are sent to protocol LSIs 228, 230, via two different tag buses (TAG OUT/IN), two different interface buses(I/F BUS A/B) and driver/receivers 232, 234, respectively.

Further, some parameters of the commands from the host computer are received by a transfer buffer LSI 240, via the driver/receivers 232, 234, transceivers 236, 238 and a data bus(BUS A/B), and are given to the MPU 222 and to the LSI 226. The protocol LSIs 228,230, the transfer buffer LSI 240, the driver/receivers 232, 234 and transceivers 236, 238 constitute the main parts of the command-receiving means 10 shown in FIG. 3. The transfer buffer LSI 240 transmits two kinds of clock signals CLXE, CLXO to the MPU 222, so that operations of the MPU 222 can be performed. These LSIs 226, 228, 230 and 240, and the MPU 222 operate in synchronism with a reference clock pulse(CL24M) generated by a 24 MHz clock oscillator.

Further, data for write access or read access are transmitted or received between the host computer and the LSI 226, via the driver/receivers 232, 234 and transceivers 236, 238. In this LSI 226, a process for conversion is executed with respect to the width of the data which are transferred to and from the encoder/decoder 224 and the width of the data which are treated in the interface circuit 220. To be more concrete, the data from the encoder/decoder 224 having the width of one Byte are converted to the data processed in the interface circuit substrate 220 having the width of two Bytes, and vice versa. In other words, this LSI 226 serves to change the frequency of digital data signals, i.e., the data transfer speed. Such a process for conversion of the width of the data is essential for the continuous-access operations at every other sector, such as each odd sector or each even sector.

Figure 5:
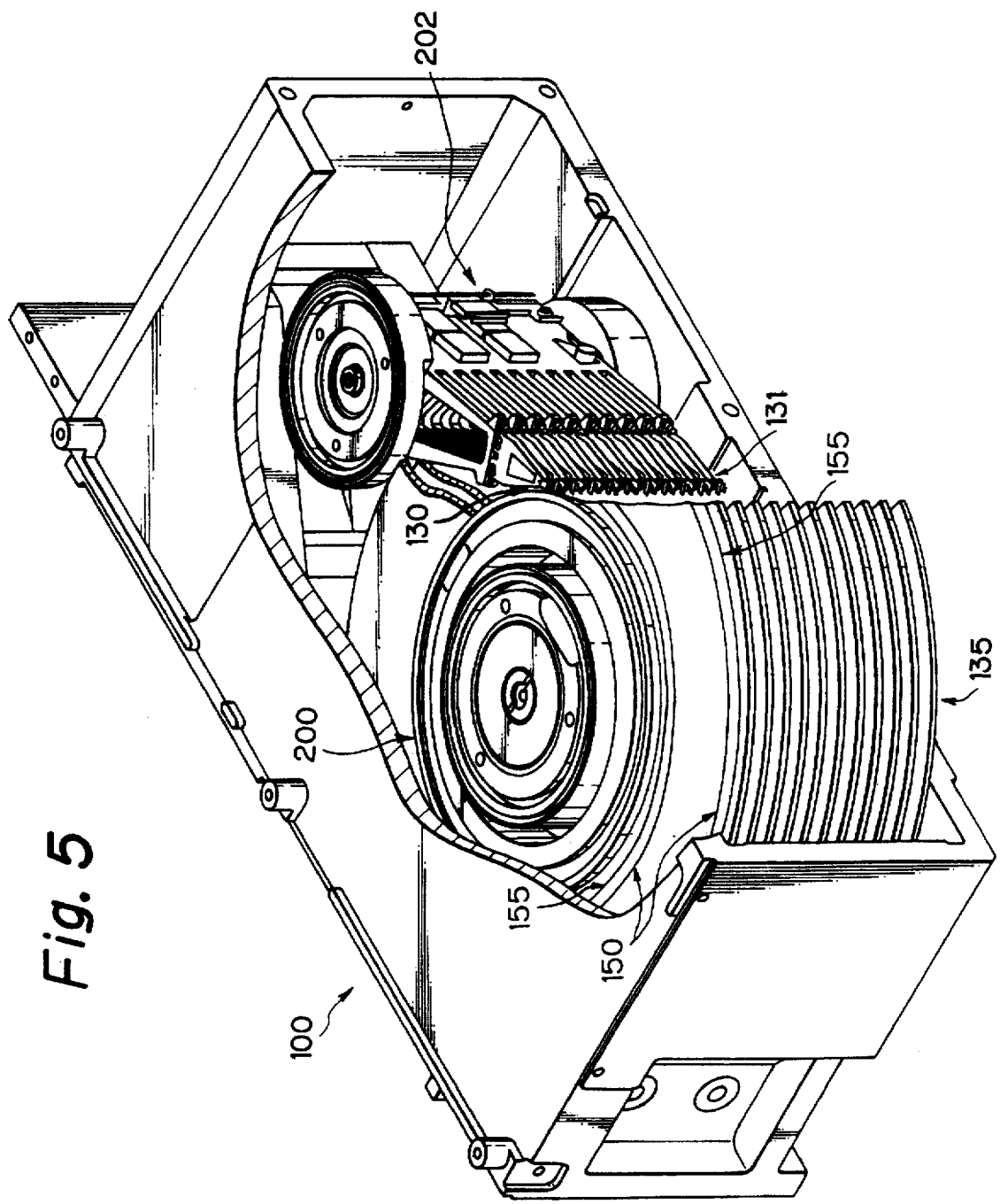
FIG. 5 is a perspective view, partially cut away, showing a mechanism of a magnetic disk drive.

Here, in order to facilitate understanding of the embodiment according to the present invention, a perspective view, partially cut away, showing a mechanism of a magnetic disk drive 100 is illustrated in FIG. 5. As seen from this figure, a plurality of magnetic disks (e.g., eleven disks) 135 are rotated simultaneously, by means of the DC motor 200. The tracks on the recording surface of each disk 135 are written with a predetermined data pattern. However, the tracks at both ends of the inner zone and the outer zone of the disk 135 are formed as guard bands 150 in which a particular pattern is written, instead of a data pattern, which particular pattern is used for stopping seek operations of two kinds of heads 130 and 131. These heads 130 and 131 are provided on the upper and the lower surfaces of each disk 135, respectively. The heads 130 and 131 are adapted to perform seek operations and access operations by moving rotatably over the respective disks 135, by means of the voice coil motor 202. Further, at the inner and the outer sides of the guard bands 150, an erase zone 155 is formed for mechanically stopping the heads 130 and 131.

Figure 6:
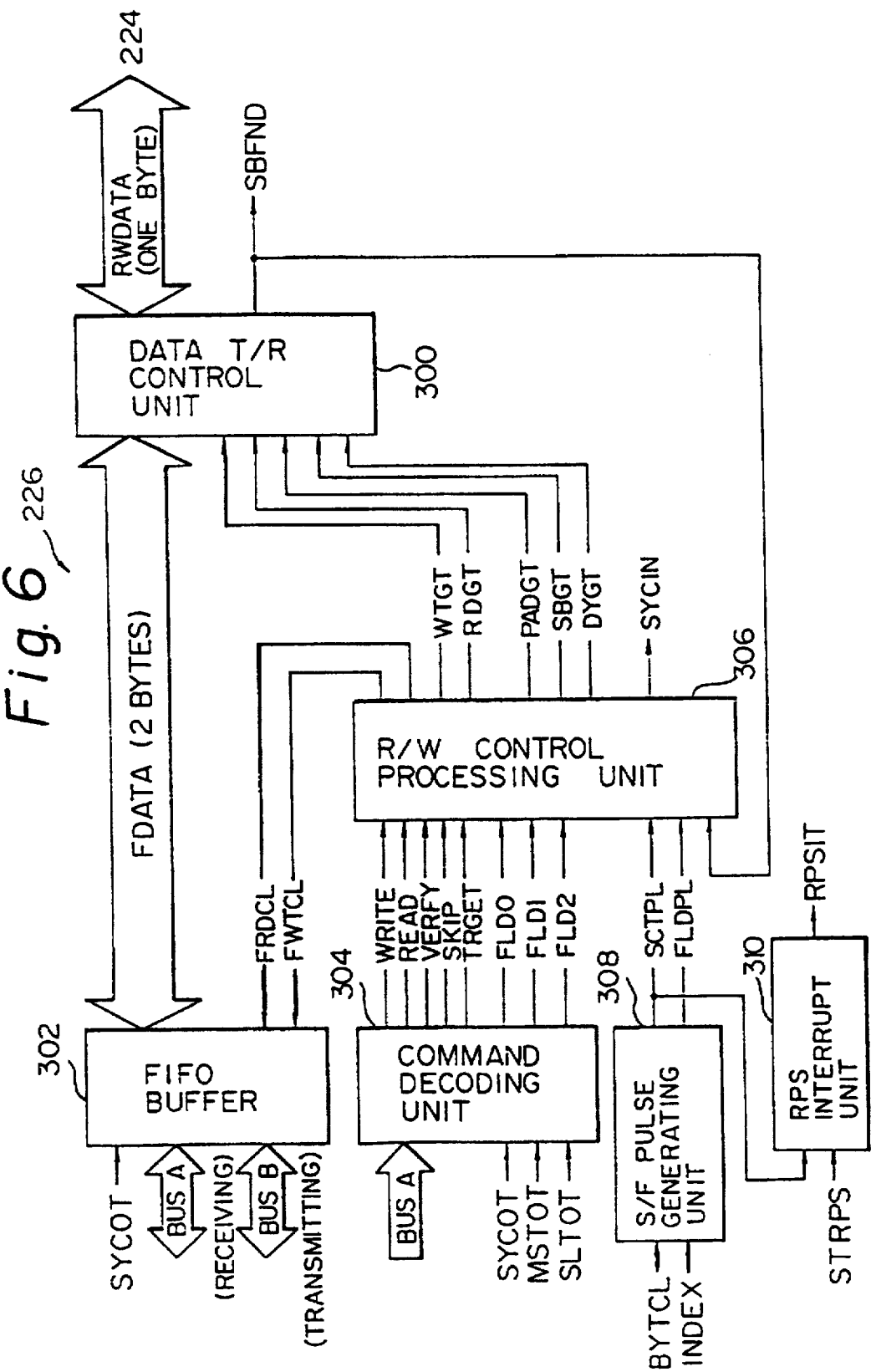
FIG. 6 is a block circuit diagram showing in detail the construction of an LSI for sector/field control in FIG. 4(A)

FIG. 6 is a block circuit diagram showing in detail the construction of an LSI for Serial/Parallel Formation Control in FIG. 4.

In FIG. 6, a data transmission/reception(T/R) control unit 300 is connected to the encoder/decoder 224 shown in FIG. 4(B). In such a construction, data for write access or read access are transferred between the data transmission/reception(T/R) control unit 300 and the encoder/decoder 224.

Further, these data are transferred between the host computer and a FIFO(First-in First-out) buffer 302, via a data bus(BUS A) for receiving and another data bus(BUS B) for transmitting, respectively. By means of the data T/R control unit 300, the data signal(FDATA) output from the FIFO (First-in First-out) buffer 302 having the width of 2 Bytes is converted to the data signal for write access or read access (RWDATA) having the width of 1 Byte. Further, various commands sent from the host computer are received by a command decoding unit 304.

Various signals based on the IPI-2 are supplied to the command decoding unit 304, via a control bus(BUS A). These signals includes a synchronous-out signal SYCOT (also supplied to the FIFO buffer 302), a master out signal MSTOT, a select out signal SLTOT.

Hereinafter, it should be noted that all the signals are defined in accordance with the IPI-2. A write signal WRITE, a read signal READ, a verify signal VERIFY, a skip signal SKIP, a target signal TRGET, and select signals FLD0, FLD1 and FLD2 for selecting a field(ID/DATA) within the given sector, are sent from the command decoding unit 304 to the read/write(R/W) control processing unit 306.

Further, an index signal INDEX and a byte clock signal BYTCL are supplied to a sector/field(S/F) pulse generating unit 308. Further, a sector pulse signal SCTPL and a field pulse signal FLDPL are output from the S/F pulse generation unit 308 and are sent to the R/W control processing unit 306.

A signal SBFND for finding a sync byte of the leading portion of the field(ID/DATA) is given simultaneously to the encoder/decoder 224 and the R/W control processing unit 306. Further, a clock signal FRDCL for field access in read operations, a clock signal FWTCL for field access in write operations, a write gate signal WTGT, a read gate signal RDGT, a padding gate signal PADGT for separating a sync byte from a noise, and a sync byte gate signal SBGT, and a data gate signal DTGT, are sent from the R/W control processing unit 306 to the data T/R control unit 300.

Further, a synchronous-in signal SYCIN issued from the R/W control processing unit 306 is transmitted to the host computer. Further, a sector pulse signal SCTPL issued from the S/F pulse generation unit 308 is also sent to an RPS interrupt unit 310.

A gate output control signal STRPS is input to the RPS interrupt unit 310. Further, a signal RPSIT for giving notice of the interrupt, which is issued from the RPS interrupt unit 310, is sent to the host computer.

Figure 7:
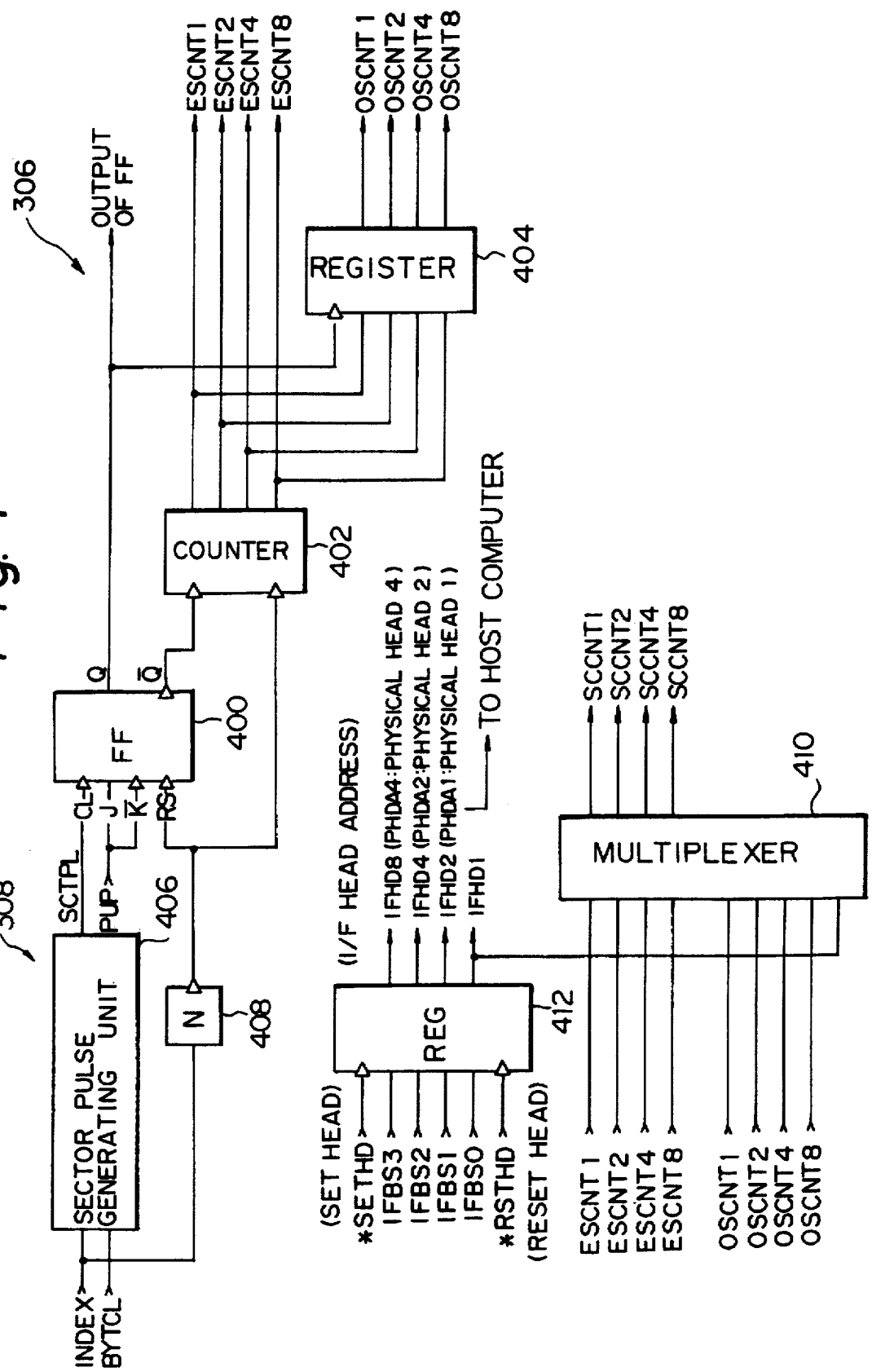
FIG. 7 is a block circuit diagram showing in detail the construction of a read/write control processing unit in FIG. 6.
Figure 8:
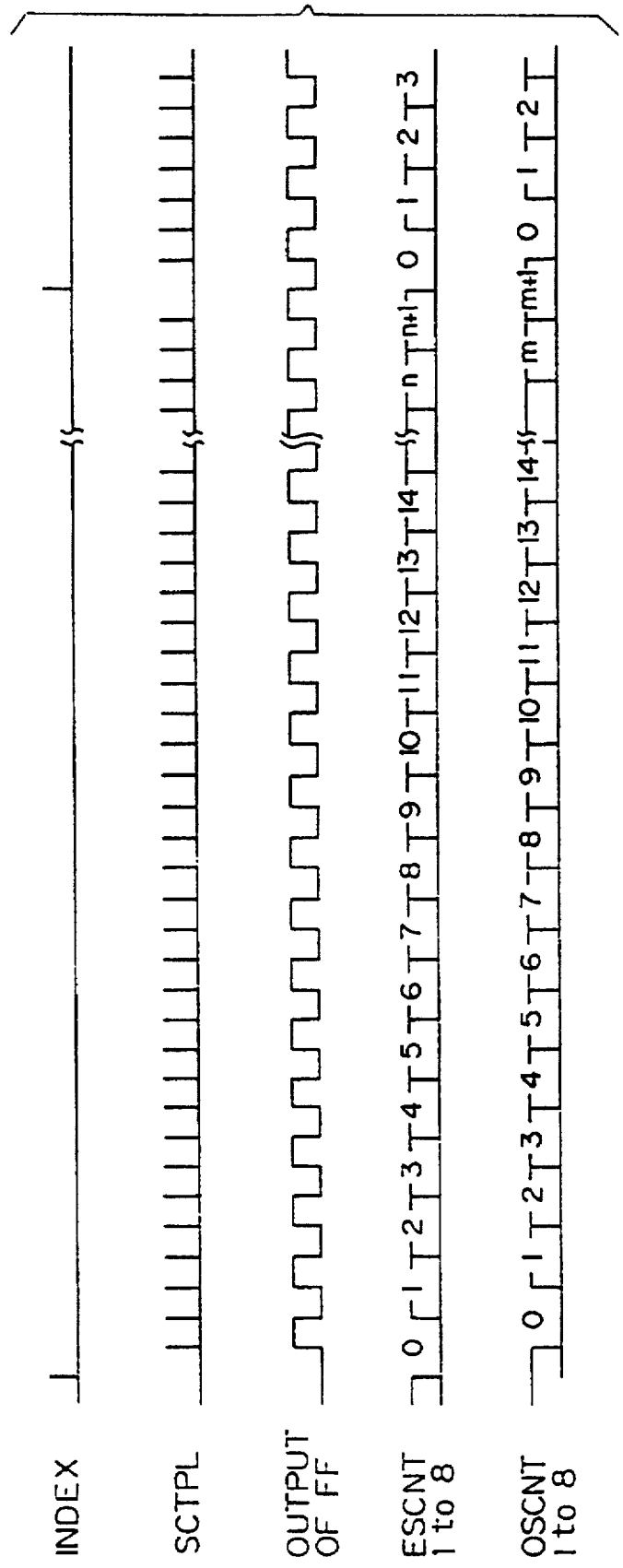
FIG. 8 is a timing chart for explaining various operations of a read/write control processing unit shown in FIG. 7.

FIG. 7 is a block circuit diagram showing in detail the construction of a read/write control processing unit in FIG. 6, and FIG. 8 is a timing chart for explaining various operations of a read/write control processing unit shown in FIG. 7.

In FIG. 7, the read/write control processing unit 306 includes a flip-flop(FF) 400 of J-k type, a counter 402 and a register 404.

Further, in FIG. 7, the byte clock signal BYTCL and the index signal INDEX also shown in FIG. 8 are supplied to a sector pulse generating unit 406 provided in the S/F pulse generation unit 308. Further, the sector pulse signal SCTPL shown in FIG. 8 is generated from the sector pulse generating unit 406.

Through an inverter(abbreviated to "N" in FIG. 7) 408, the index signal INDEX is sent to the FF 400, together with the sector pulse signal SCTPL. Further, an inverted output of the FF 400 and an inverted output of the inverter 408 are sent to the counter 402.

Further, a plurality of outputs ESCN1, ESCN2, ESCN4 and ESCN8 of the counter 402 for even sectors, and an non-inverted output of the FF 400, are sent to the register 404. Further, a plurality of outputs OSCNT1, OSCNT2, OSCNT4 and OSCNT8 for odd sectors are issued by the register 404.

Here, with reference to FIGS. 7 and 8, operations of the FF 400, the counter 402, etc., will be described.

The FF 400 operates in a manner such that a period thereof is determined by two pulses of the sector pulse signal, as illustrated in the portion of "OUTPUT OF FF" in FIG. 8. The counter 402 counts up in accordance with the inverted output of the FF 400, while the register 404 takes in the outputs ESCN1, ESCN2, ESCN4 and ESCN8 of the counter 402 in accordance with the non-inverted output of the FF 400. Consequently, the phase difference equivalent to the length of one sector occurs between the outputs ESCN1, ESCN2, ESCN4 and ESCN8 of the counter 402 for even sectors and the outputs OSCNT1, OSCNT2, OSCNT4 and OSCNT8 of the register 404 for odd sectors, as illustrated in the portion of "ESCNTs1 to 8 and OSCNTs1 to 8" in FIG. 8.

Returning to FIG. 7, the outputs ESCN1, ESCN2, ESCN4 and ESCN8 of the counter 402, and the outputs OSCNT1, OSCNT2, OSCNT4 and OSCNT8 of the register 404, are input to a multiplexer 410. In this multiplexer 410, either one of the input signal group ESCN1, ESCN2, ESCN4 and ESCN8 for even sectors, or the other input signal group OSCNT1, OSCNT2, OSCNT4 and OSCNT8 for odd sectors, is selected as sector count signals SCCNT1, SCCNT2, SCCNT4 and SCCNT8.

In this case, the number of physical heads is actually half the number of logical heads. Accordingly, the least significant address bit IFHD1 of the interface(I/F) head addresses IFHD8, IFHD4, IFHD2 and IFHD1 based on the logical heads is not necessary for the physical head addresses. Therefore, the physical head addresses are defined as PHDA4, PHDA2 and PHDA1(corresponding to IFHD8, IFHD4 and IFHD2, respectively). Namely, the least significant address bit IFHD1 of the interface(I/F) head addresses can be utilized for another purpose.

Thus, a switching operation for selecting the above-mentioned input signal group(ESCN1, ESCN2, ESCN4 and ESCN8) for even sectors, or the other input signal group (OSCNT1, OSCNT2, OSCNT4 and OSCNT8) for odd sectors, can be performed by utilizing such a least significant address bit IFHD1 of the interface(I/F) head addresses. On the other hand, the logical head addresses IFBS3, IFBS2, IFBS1 and IFBS0 are sent from the host computer to the register 412. Also, a set pulse SETHD for starting access operations and a reset pulse RSTHD for stopping access operations are supplied to the register 412.

In other words, by means of the register 412, sixteen logical head addresses are converted to the total eight physical addresses. Finally, in the multiplexer 410, either one of the input signal group(ESCN1, ESCN2, ESCN4 and ESCN8) output from the counter 402, or the other input signal group(OSCNT1, OSCNT2, OSCNT4 and OSCNT8) output from the register 404, is selected as the sector count signals SCCNT1, SCCNT2, SCCNT4 and SCCNT8. These sector count signals SCCNT1, SCCNT2, SCCNT4 and SCCNT8 have the duration equal to the length of two sectors, respectively.

Further, the sector count signals SCCNT1, SCCNT2, SCCNT4 and SCCNT8, i.e., the selective output signals between the even sectors or odd sectors, which are output from the multiplexer 410, are treated as the unit of access for sectors by the R/W control processing unit 306. Therefore, the continuous-access operations are performed at every other sector, such as each even sector or each odd sector.

Figure 9:
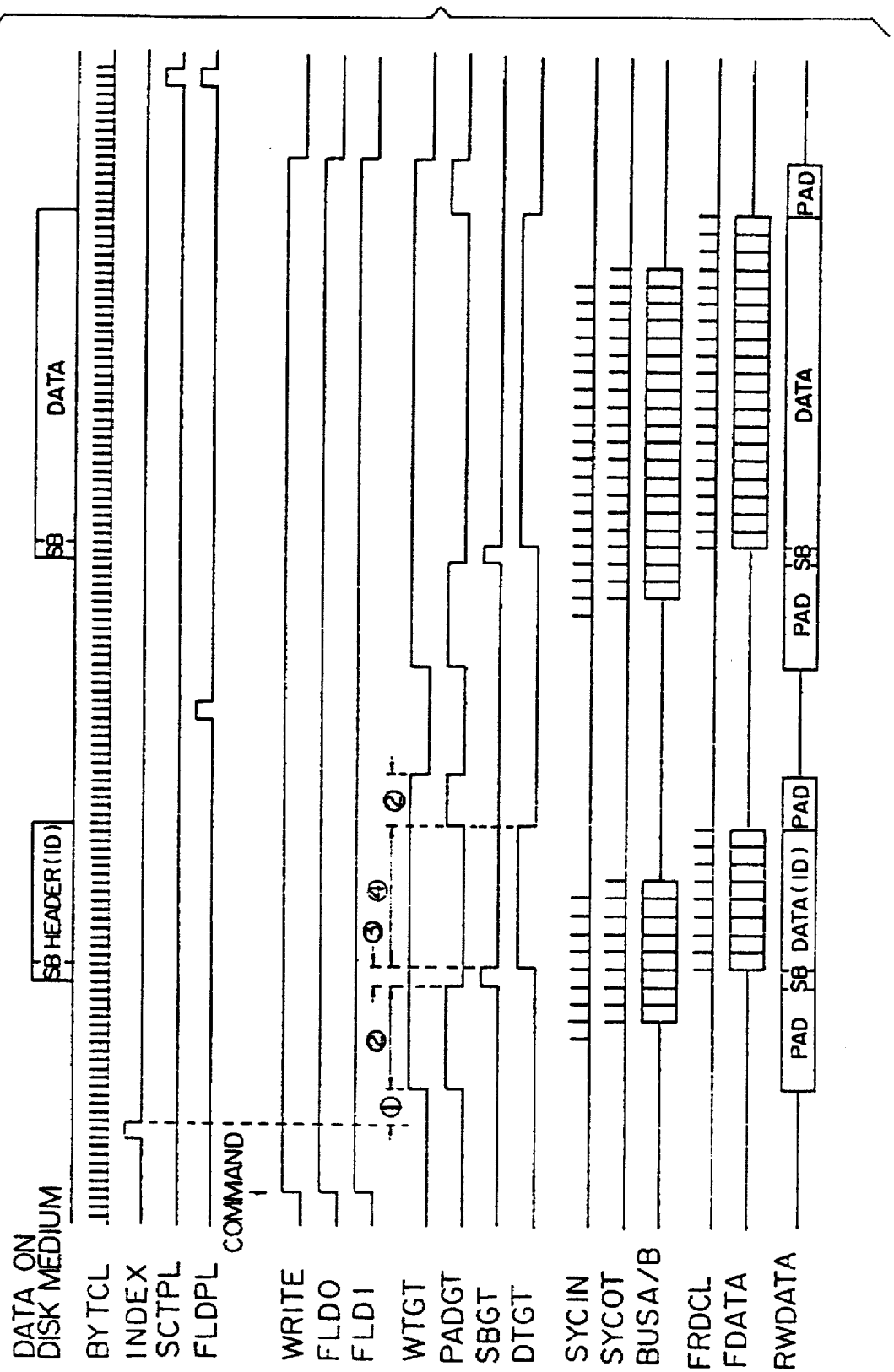
FIG. 9 is a timing chart for explaining write-access operations of a concrete embodiment according to the present invention.

FIG. 9 is a timing chart for explaining write-access operations of a concrete embodiment according to the present invention.

In FIG. 9, when a write signal WRITE and select signals FLD0, FLD1 become active("HIGH") by a command for write access, and then an index signal INDEX is generated, the time lapse of a first duration① is monitored by a byte clock signal BYTCL.

When this duration ① has elapsed, a write gate signal WTGT and a padding gate signal PADGT become active. Further, during a second duration②, a gap pattern PAD for padding is written by utilizing the data signal for write access or read access(RWDATA).

Further, the leading portion of identification data in the field DATA(ID), i.e., a sync byte SB, is detected, and a sync byte gate signal SBGT is obtained in a third duration ③. Then, during a fourth duration ④, a data gate signal DTGT becomes active, and data in a field ID, e.g., the field 0, is written by utilizing the data signal for write access or read access(RWDATA).

When write operations of the data in the field ID has been completed, a padding gate signal PADGT becomes active again during the other second duration②. In this duration ②, a gap pattern PAD for padding is written again by utilizing the data signal for write access or read access (RWDATA).

Further, when a synchronous-in signal SYCIN is issued, the requirement for transmission of the data of ID is sent to the host computer. Further, the host computer signals that the data are transmitted, by means of a synchronous-out signal SYCOUT. Further, the data signal(FDATA) having the width of 2 Bytes are sent from the FIFO buffer 302. In the data T/R control unit 300, the data signal(FDATA) are converted to the data signal for write access or read access (RWDATA) having the width of 1 Byte.

In this way, when write operations have been completed, the effective data in a field DATA constituting the major portion for write access in a similar manner to the case where the data are written in the field ID. In this case, the write operations of data in the fields DATA and ID are performed within the duration of one sector before the next sector pulse signal SCTPL is issued.

Figure 10:
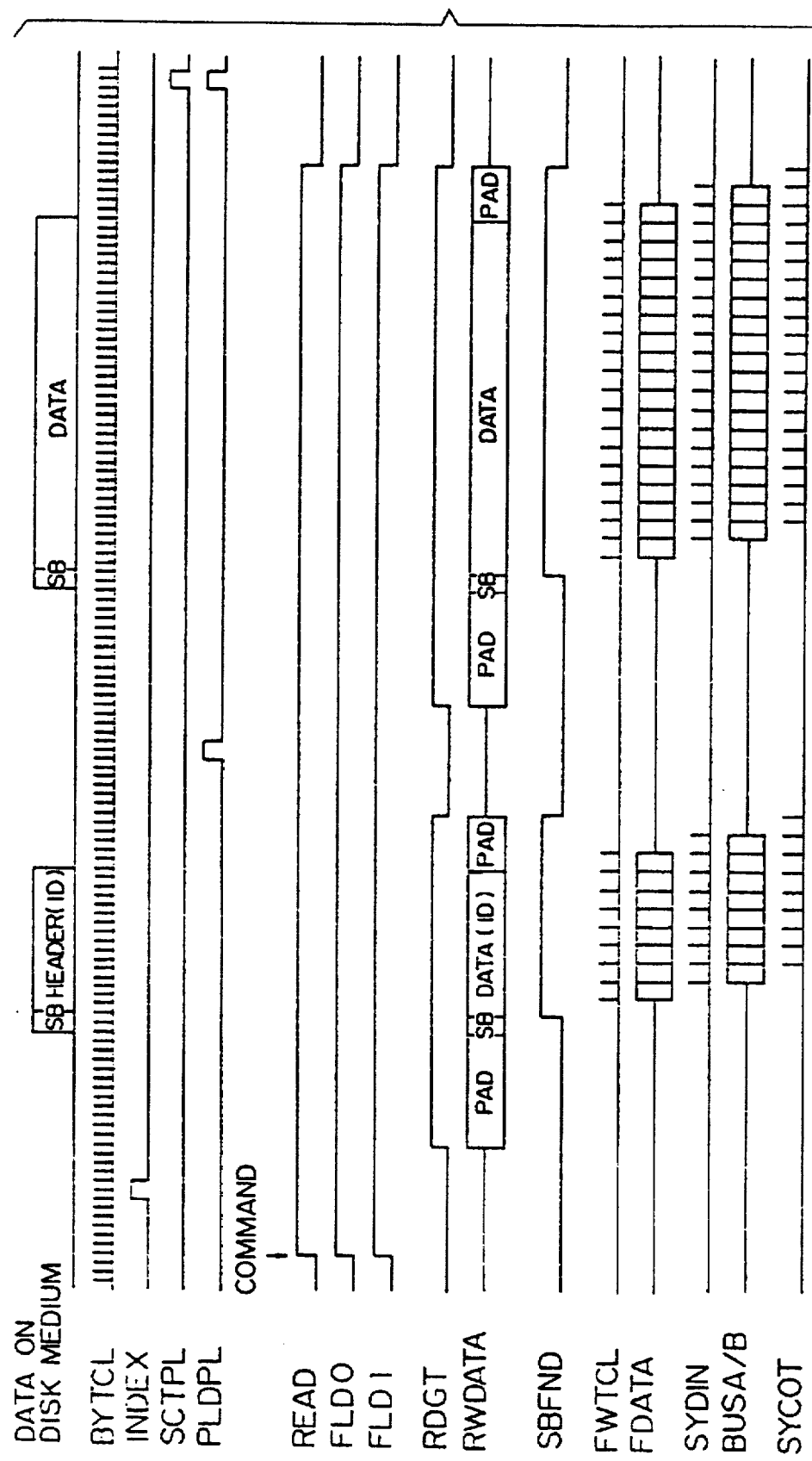
FIG. 10 is a timing chart for explaining read-access operations of a concrete embodiment according to the present invention.

FIG. 10 is a timing chart for explaining read-access operations of a concrete embodiment according to the present invention.

As shown in FIG. 10, the read-access operations of a concrete embodiment are substantially the same as the write-access operations described above, excepting that the name of signals are partially different, and that the direction of data transfer in write access is opposite to that in read access. Therefore, the detailed description regarding the read-access operations will be omitted.

Also in the read-access operations, it should be noted that data are read out of the fields DATA and ID within the duration of one sector before the next sector pulse signal SCTPL is issued. Further, the read data is transmitted to the host computer in accordance with a synchronous-in signal SYCIN and a synchronous-out signal SYCOUT. Further, the data signal for write access or read access(RWDATA) having the width of 1 Byte are converted to the data signal (FDATA) having the width of 2 Bytes, in the data T/R control unit 300. Further, the data signal(FDATA) are sent to the FIFO buffer 302.

FIGS. 11(A) to 11(C) are format diagrams for explaining continuous-access operations of odd and even sectors in a magnetic disk drive of a concrete embodiment according to the present invention. Here, the case where write operations are performed in the form of continuous-access operations at each even sector and odd even sector, will be explained representatively.

In FIG. 11(A), a format diagram, in which write operations are performed for all the consecutive sectors, including even and odd sectors, is illustrated.

Further, in FIG. 11(B), a format diagram, in which write operations are performed for only even sectors, is illustrated. In this case, the signal groups(ESCN1, ESCN2, ESCN4 and ESCN8) output from the counter 402 are selected by the multiplexer 410. Accordingly, write access for only even sectors are sequentially performed.

Further, in the upper portion of FIG. 11(C), a format diagram, in which write operations are performed for only odd sectors, is illustrated. In this case, the other signal groups(OSCN1, OSCN2, OSCN4 and OSCN8) output from the register 404 are selected by the multiplexer 410. Accordingly, write access for only odd sectors is sequentially performed.

As apparent from FIG. 11(B), since odd sectors are not used for write access, each of the odd sectors can be utilized as the controller gap CG. Namely, a command for write access for the next even sector can be transmitted in the duration of the preceding odd sector that is not utilized for write access.

On the other hand, in the upper portion of FIG. 11(C), since even sectors are not used for write access, each of the even sectors can be utilized as the controller gap CG. Namely, a command of write access for the next odd sector can be transmitted in the duration of the preceding even sector that is not utilized for write access.

Furthermore, in the lower portion of FIG. 11(C), the timing in which each of command signals for executing the access command is transmitted, and in which each of data signals is transmitted, are illustrated together, in the case where write operations are performed for only odd sectors. In this case, it should be noted that the duration of the preceding even sector can be fully utilized for the controller gap CG.

If the write-access operations for only even sectors are continuously performed, and then write-access operations for only odd sectors are also continuously performed, it becomes possible for the write-access operations to be performed for all the consecutive sectors including even and odd sectors, as shown in FIG. 11(A). In this case, it should be noted that a magnetic disk has to rotate twice, in order to complete the write-access operations for all the sectors in one track.

Figure 12:
FIG. 12 is a format diagram showing in an enlarged form a format configuration of each physical sector of a magnetic disk of a concrete embodiment according to the present invention.

FIG. 12 is a format diagram showing in an enlarged form a format configuration of each physical sector of a magnetic disk of a concrete embodiment according to the present invention; and FIGS. 13(A) and 13(B) are conceptual diagram for explaining a feature of a magnetic disk drive of a concrete embodiment according to the present invention, in comparison with the prior art.

As shown in FIG. 12, each of the sectors which is skipped in a jump-access operation is treated as the controller gap CG, and therefore it becomes unnecessary for the controller gap CG to be provided on each of the sectors in which the data are written in the field ID and DATA by access operations.

Consequently, in the embodiment according to the present invention, the amount of data can be increased more than that in the prior art, by virtue of the jump-access operations, as shown in FIGS. 13(A) and 13(B). To be more specific, the length of field where the effective data are written in the present invention of 13(B) becomes larger than that in the prior art of FIG. 13(A), by the amount of increase indicated by hatched lines.

Here, under the same condition as the case of the prior art described before, a value of the format efficiency in the magnetic disk drive of the present invention will be estimated.

For example, it is assumed that the magnetic disk drive includes a plurality of magnetic disks and has the whole capacity of 2,648,136,240 Bytes(the capacity at every track is 66,096 Bytes/Track, the number of magnetic heads is 15 Heads, and the number of tracks at every recording/reproducing surface is 2,671 Tracks; namely, 66,096×15×2,671=2,648,136,240), as described before. Further, it is assumed that the gap length of the gap G1 is 22 Bytes; the gap length of the gap G2 is 26 Bytes; the gap length of the gap DG is 26 Bytes; the gap length of the gap CG is 0; the length of the identification field ID is 12 Bytes; and the length of the data field DATA is 514 Bytes. In this case, the capacity at every sector becomes 600 Bytes/Sector {the total gap length is 74(=22+26+26), and the length of fields is 526 (=12+514) }, and the number of sectors at every track becomes 110 Sectors/Track(≈66,096÷600). Consequently, a value of the format efficiency in the magnetic disk drive of the present invention is increased up to 84.54%(514 Bytes× 110 Sectors/Track×15 Heads×2,671 Tracks÷2,648,136,240 Bytes). Namely, a value of the format efficiency in the magnetic disk drive of the present invention become larger than that in the prior art by approximately 10%, and the capacity of the magnetic disk can be utilized more effectively than the case of the prior art.

Moreover, the switching operations between even sectors and odd sectors are executed by utilizing the least significant physical address IFHD1, when the logical head addresses are changed to the physical head addresses. Therefore, it becomes possible for the host computer and the host controller to easily control the physical heads without recognizing access operations for even and odd sectors.

FIGS. 14(A) to 14(C) are conceptual diagram for explaining another feature of a magnetic disk drive of a concrete embodiment according to the present invention.

In FIGS. 14(A), especially, it is emphasized that the controller gap CG, which is necessary in the prior art, can be completely omitted in the sectors in which the data are written, according to the present invention.

Here, the relation between the data transfer speed for write access or read access and the relative length of the controller gap CG will be described with reference to FIGS. 14(B) and 14(C). In this case, it is assumed that the gap length of the gap G1 is 5 Bytes; the length of the identification field ID is 5 Bytes; the gap length of the gap G2 is 5 Bytes) the length of the data field DATA is 12 Bytes; the gap length of the data gap DG is 5 Bytes; and the gap length of the controller gap CG is 1 µs(5 Bytes), to simplify the explanation about the above-mentioned relation.

As shown in FIG. 14(B), in the case where the data transfer speed is 5 MB/s, the duration of 1 Byte is 200 ns(BYTCL) and therefore the gap length of the controller gap CG becomes 5 Bytes. At this time, the number of the bytes at every sector is 37 Bytes/Sector, and the ratio of the data field DATA to the whole region of one sector becomes 32.4%.

Further, as shown in FIG. 14(C), in the case where the data transfer speed is increased up to 10 MB/s, the duration of 1 Byte is 100 ns and therefore the gap length of the controller gap CG is 10 Bytes. At this time, the number of the bytes at every sector is 42 Bytes/Sector, and the ratio of the data field DATA to the whole region of one sector is reduced to 28.57%.

Namely, as the data transfer speed is increased, the relative length of the controller gap CG is increased, while the ratio of the data field DATA to the whole region of one sector is decreased.

However, in the magnetic disk drive of the present invention, it becomes unnecessary for the controller gap CG to be provided on the sectors in which the data are written in the field ID and DATA by access operations, as illustrated in FIGS., 14(B) and 14(C). Therefore, in the present invention, by increasing the data transfer speed, i.e., the amount of data transferred within the given duration, it is possible that a large amount of data can be transferred at relatively high speed and the format efficiency is remarkably increased.

As described above, the present invention has been illustrated with respect to one concrete embodiment using a magnetic disk drive as a disk drive. However, the present invention is applicable to a magneto-optical disk drive, an erasable optical disk drive, a magnetic tape apparatus and a semiconductor disk apparatus, and the like.

While the present invention has been described as related to the preferred embodiment, it will be understood that various changes and modifications may be made without departing from the spirit and the scope of the invention as hereinafter claimed.

What is claimed is:

1. A disk drive comprising:
   at least one rotating disk medium which is constituted by a plurality of tracks each divided into a plurality of sectors for storing data;
   command-receiving means for receiving and forwarding a read/write command from a host device, by which access operations for consecutive sectors of said disk medium are requested;
   access-designating means for designating continuous-access operations in the form of jump-access operations with respect to the sectors, when said read/write command is forwarded from said command-receiving means; and
   continuous-access executing means for sequentially writing continuous data in consecutively non-adjacent sector locations during write operations, and sequentially reading continuous data from consecutively non-adjacent sector locations during read operations when said continuous-access operations are designated by said access-designating means based on said read/write command, said host device obtaining additional addresses at least partially as said head passes between consecutively non-adjacent sectors.

2. A disk drive as set forth in claim 1, wherein the disk drive is comprised of a magnetic disk drive including one magnetic disk as said disk medium and including one magnetic head which performs access operations for read/write operations of said data on said sectors.

3. A disk drive as set forth in claim 1, wherein the disk drive is comprised of a magnetic disk drive including a plurality of magnetic disks as said disk medium and including a plurality of magnetic heads which perform access operations for read/write operations of said data on said sectors of the respectively corresponding magnetic disks.

4. A disk drive comprising:
   at least one disk medium that is constituted by a plurality of tracks each divided into a plurality of sectors including odd sectors and even sectors for storing data, on which access operations for read and write operations of said data are performed by a single physical head;
   command-receiving means for receiving and forwarding a command from a host device which includes a requirement for said access operations for consecutive sectors of said disk medium, and which includes content such that either one of two virtual heads defined with respect to the same head is selected in said access operations;
   access-designating means for designating continuous-access operations of either said odd sectors or said even sectors in accordance with said virtual head selected by said command, when said command is forwarded from said command-receiving means; and
   continuous-access executing means for sequentially writing continuous data into only said odd sectors during said write operations, and sequentially reading continuous data from only said odd sectors during said read operations, or for sequentially writing continuous data into only said even sectors during said write operations, and sequentially reading continuous data from only said even sectors during said read operations by utilizing said single physical head in accordance with an instruction given by said access-designating means based on said command, said host device obtaining additional addresses at least partially as said head passes between every other sector.

5. A disk drive as set forth in claim 4, wherein the disk drive is comprised of a magnetic disk drive including one magnetic disk as said disk medium and including one magnetic head provided on said magnetic disk as said head.

6. A disk drive as set forth in claim 4, wherein the disk drive is comprised of a magnetic disk drive including a plurality of magnetic disks as said disk medium and including a plurality of magnetic heads provided corresponding to the respective magnetic disks.

7. A disk drive as set forth in claim 1, wherein said command-receiving means includes:
   at least one driver/receiver which receives said command transmitted from said host device through at least one interface cable; and
   a transfer buffer circuit which receives data including said command transferred from said driver/receiver, wherein said access-designating means includes:
      a circuit for converting a width of data between a first width of data that is handled in said command-receiving means and a second width of data that is handled in said continuous-access executing means and sending data corresponding to said second width of data to said continuous-access executing means, so that said continuous-access operations at consecutively non-adjacent sector locations can be realized, and wherein said continuous-access executing means includes a read/write control circuit which controls said continuous-access operations in accordance with the data sent from said circuit for converting a width of data.

8. A disk drive as set forth in claim 4, wherein said command-receiving means includes:
   at least one driver/receiver which receives said command transmitted from said host device through at least one interface cable; and
   a transfer buffer circuit which receives and forwards data including said command transferred from said driver/receiver, wherein said access-designating means includes:
      a circuit for converting a width of data between a first width of data that is handled in said command-receiving means and a second width of the data that is handled in said continuous-access executing means and sending data corresponding to said second width of data to said continuous-access executing means, so that said continuous-access operations at each odd sector only or each even sector only can be realized, and wherein said continuous-access executing means includes:
      a read/write control circuit which controls said continuous-access operations in accordance with the data sent from said circuit for converting a width of data.

9. A disk drive as set forth in claim 8, wherein said circuit for converting a width of data has:
   a first-in/first-out buffer through which the data is transferred to and from said host device;
   a data transmission/reception control unit in which the data forwarded from said transfer buffer circuit is converted to data adequate for said continuous-access operations; and
   a read/write control processing unit which sends signals for selecting either said even sectors or said odd sectors in accordance with said command from said host device, to said data transmission/reception control unit.

10. A disk device comprising:
    at least one rotating storage medium which stores continuous data in a plurality of consecutively non-adjacent sectors such that continuous data is read in sequence from consecutively non-adjacent sectors;
    at least one head which reads said data from said alternating sectors during a read operation as said storage medium rotates, and
    a processor which selects addresses to be read by said head and processes said data read by said head at said selected addresses, said processor obtaining additional addresses for data to be read at least partially as said head passes between alternating sectors.

11. A disk device as set forth in claim 10, wherein the disk device is comprised of a magnetic disk drive including one magnetic disk as said rotating storage medium, and including at least one magnetic head which performs access operations for read/write operations of said data on said sectors.

12. A disk device as set forth in claim 10, wherein the disk device is comprised of a magnetic disk drive including a plurality of magnetic disks as said rotating storage medium and including a plurality of magnetic heads which perform access operations for read/write operations of said data on said sectors of the respectively corresponding magnetic disks.

* * * * *

UNITED STATES PATENT AND TRADEMARK OFFICE
CERTIFICATE OF CORRECTION

PATENT NO. : 5,696,640  Page 1 of 2
DATED : December 9, 1997
INVENTOR(S) : Masafumi Satoh It is certified that error appears in the above-identified patent and that said Letters Patent is hereby corrected as shown below:

On thje title page:

Under "[54] Title," delete "HANDS" and insert --HEADS-- therefor

Under "[56] References Cited," insert

--Foreign Patent Documents

| | | |
|---|---|---|
| 57-109071 | 7/1982 | Japan |
| 58-1861 | 1/1983 | Japan |
| 60-169929 | 9/1985 | Japan |
| 3-156523 | 7/1991 | Japan |
| 4-148254 | 5/1992 | Japan-- |

Column 7, line 26, delete "Formutter" and insert --Formatter-- therefor

UNITED STATES PATENT AND TRADEMARK OFFICE
CERTIFICATE OF CORRECTION

PATENT NO. : 5,696,640
DATED : December 9, 1997
INVENTOR(S) : Masafumi Satoh

It is certified that error appears in the above-identified patent and that said Letters Patent is hereby corrected as shown below:

Column 8, line 29, delete "Formation" and insert --Formatter-- therefor

Column 13 line 25, delete "Bytes)" and insert --Bytes;-- therefor

Signed and Sealed this

Twenty-second Day of September, 1998

Attest:

BRUCE LEHMAN

*Attesting Officer*     *Commissioner of Patents and Trademarks*